(12) United States Patent
Yu et al.

(10) Patent No.: US 11,605,999 B2
(45) Date of Patent: Mar. 14, 2023

(54) STATOR FOR DRIVE MOTOR (71) Applicants: HYUNDAI MOTOR COMPANY, Seoul (KR); KIA MOTORS CORPORATION, Seoul (KR)

(72) Inventors: Jae Min Yu, Incheon (KR); Hyoung Jun Cho, Suwon-si (KR); Jae Won Ha, Hwaseong-si (KR); Myung Kyu Jeong, Siheung-si (KR); Yong Sung Jang, Hwaseong-si (KR); Deok Hwan Na, Seoul (KR); Young Jin Seo, Yongin-si (KR); Dong Yeon Han, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 176 days.

(21) Appl. No.: 17/114,817

(22) Filed: Dec. 8, 2020

(65) Prior Publication Data
US 2021/0399605 A1  Dec. 23, 2021

(30) Foreign Application Priority Data
Jun. 22, 2020 (KR) .......... 10-2020-0075498

(51) Int. Cl.
*H02K 5/20* (2006.01)
*H02K 1/14* (2006.01)
(Continued)

(52) U.S. Cl.
CPC .............. *H02K 5/203* (2021.01); *B60K 1/00* (2013.01); *H02K 1/145* (2013.01); *H02K 3/525* (2013.01);
(Continued)

(58) Field of Classification Search
CPC ........ H02K 5/203; H02K 1/145; H02K 3/525; H02K 9/19; H02K 2203/12; H02K 3/522;
(Continued)

(56) References Cited

U.S. PATENT DOCUMENTS

| 2011/0133581 A1* | 6/2011 | Ha | H02K 3/522 |
| | | | 310/71 |
| 2018/0175679 A1* | 6/2018 | Seo | H02K 3/24 |
| 2019/0097499 A1* | 3/2019 | Yim | H02K 5/203 |

FOREIGN PATENT DOCUMENTS

| KR | 20150141353 A | * 12/2015 |
| KR | 10-2020-0040118 A | 4/2020 |

OTHER PUBLICATIONS

KR20150141353A English Translation (Year: 2022).*

* cited by examiner

*Primary Examiner* — Tulsidas C Patel
*Assistant Examiner* — Viswanathan Subramanian
(74) *Attorney, Agent, or Firm* — Lempia Summerfield Katz LLC (57) ABSTRACT

A stator for a drive motor includes: a segmented stator core including a plurality of mounting portions; a bobbin equipped on each mounting portion of the plurality of the mounting portions and having a coil wound thereon; a first casing and a second casing coupled to the bobbin, respectively, at opposite sides of the bobbin with respect to the segmented stator core, and configured to enclose the coil; a passage formed in one of the first casing or the second casing, and configured to allow fluid communication with the inside of the first casing and the second casing; and a terminal portion integrally formed in a remaining one of the first casing or the second casing and configured to allow connection of the coil.

9 Claims, 7 Drawing Sheets

(51) Int. Cl.
*H02K 3/52* (2006.01)
*B60K 1/00* (2006.01)
*H02K 9/19* (2006.01)

(52) U.S. Cl.
CPC .......... *H02K 9/19* (2013.01); *B60K 2001/003* (2013.01); *H02K 2203/12* (2013.01)

(58) Field of Classification Search
CPC ............ H02K 1/20; H02K 9/197; H02K 9/00; H02K 1/16; H02K 3/521; H02K 5/20; B60K 1/00; B60K 2001/003; B60K 11/02; B60K 2001/006
See application file for complete search history.

STATOR FOR DRIVE MOTOR

CROSS-REFERENCE TO RELATED APPLICATION

The application claims priority to and the benefit of Korean Patent Application No. 10-2020-0075498, filed on Jun. 22, 2020, the entire contents of which are incorporated herein by reference.

FIELD

The present disclosure relates to a stator for a drive motor.

BACKGROUND

The statements in this section merely provide background information related to the present disclosure and may not constitute prior art.

In recent years, an engine powered by using fuel and an electric motor system driven by electric power have been efficiently combined to drive a vehicle, and there is increasing interest in a hybrid electric vehicle (HEV) that is an eco-friendly vehicle capable of improving fuel efficiency by using engine power and electric motor power together.

Types of the HEVs may be broadly divided into a soft type, a hard type, and a plug-in type. In any type of the HEVs, mounted is an electric motor that drives the vehicle with a power source of a high voltage battery.

Figure 1:
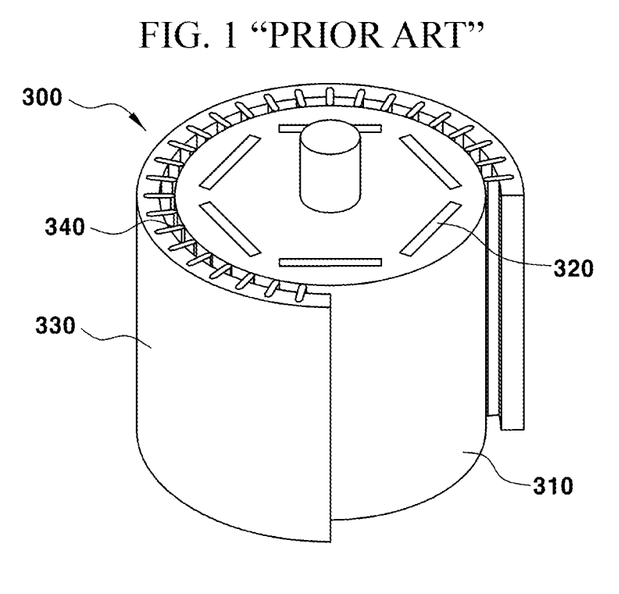
FIG. 1 shows a typical permanent magnet synchronous motor.

A typical drive motor 300 for the HEVs is shown in FIG. 1. The drive motor for the HEV uses mainly a permanent magnet synchronous motor (PMSM) and includes a rotor including a rotor core 310 in which permanent magnets 320 are mounted along the circumference thereof and a stator in which a coil 340 is wound on a stator core 330.

An electric motor includes components for output, such as permanent magnets, cores, coils, and the like. These components generate heat in the electric motor due to electrical resistance and the like during operation, which may cause a phenomenon where a component is irreversibly deteriorated under certain high-temperature conditions. Such deterioration may cause damage to the component and decrease motor performance. Therefore, in order to maintain the performance of the motor, a cooling structure is included in the drive motor of the HEV Cooling method of the motor may include an air-cooled type, water-cooled type, and oil-scatter type. In the air-cooled method, a heat radiation fin is formed in the motor housing to cool by an external cooling wind. A cooling channel is prepared inside the motor housing or outside the stator for cooling by cooling water in the water-cooled type. In the oil-scatter type, cooling oil, such as auto transmission fluid (ATF) oil, is scattered to a rotor sleeve and bobbin.

In addition, the motor can be cooled directly or indirectly. The direct cooling may include, as an example, the oil scatter-type. The indirect cooling may include, as examples, water-cooling through cooling water flowing through a cooling channel in a support ring 350, and a water cooling-type or an oil cooling-type using cooling water or oil flowing through a channel between the support ring 350 and the motor housing.

Figure 2:
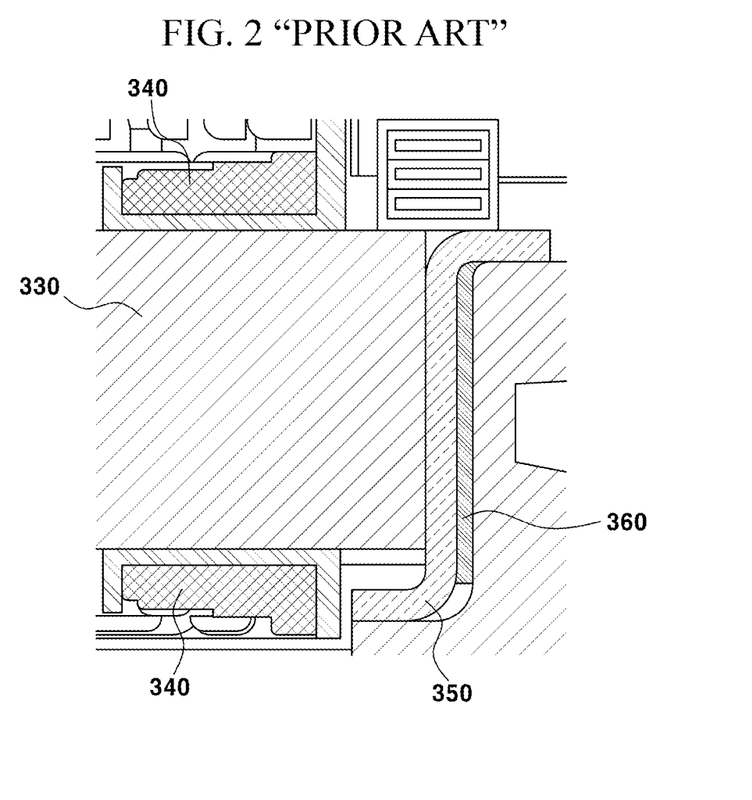
FIG. 2 shows a sectional view of a portion of a perimeter of a stator.

With reference to FIG. 2, among the above-described cooling methods, a heat transfer path becomes comparatively long in case of the indirect cooling, which results in low cooling efficiency. As for the oil-scatter type, certain areas are subjected to heat as limited areas are cooled.

Currently, coil connection portions are not respectively cooled, while the coil being a main heat source is cooled by the indirect cooling method or the oil-scatter method using a small amount of oil. In case of the indirect cooling, since the heat transfer path starts from the coil (heat source) and consecutively passes through the bobbin, the stator core, the support ring, and the cooling channel, the cooling efficiency is low. In the scatter method, constancy of cooling may not be maintained due to minor factors, such as driving conditions, inclination of the vehicle, and the like.

The foregoing is intended merely to aid in the understanding of the background of the present disclosure, and is not intended to mean that the present disclosure falls within the purview of the related art that is already known to those skilled in the art.

SUMMARY

The present disclosure provides a stator for a drive motor, the stator including a cooling structure capable of increasing cooling efficiency of the drive motor for a vehicle.

The present disclosure further provides a stator for the drive motor, the stator being equipped with a structure capable of cooling a connection portion of a coil that has been provided in an existing drive motor with no means for cooling the connection portion of the coil.

In an aspect of the present disclosure, the stator includes: a segmented stator core comprising a plurality of mounting portions; a bobbin equipped on each mounting portion of the plurality of the mounting portions and having a coil wound thereon; a casing coupled to the bobbin to enclose the coil; and a passage formed in the casing to allow fluid communication with the inside of the casing, wherein cooling oil flows in and out of the casing.

In an aspect of the present disclosure, the stator includes: a segmented stator core comprising a plurality of mounting portions; a bobbin equipped on each mounting portion of the plurality of the mounting portions and having a coil wound thereon; a first casing and a second casing coupled to the bobbin at opposite sides, respectively, of the bobbin with respect to the segmented stator core to enclose the coil; a passage formed in one of the first casing or the second casing to allow fluid communication with the inside of the first casing and the second casing, wherein cooling oil flows in and out of the first casing or the second casing; and a terminal portion integrally formed in a remaining one of the first casing or the second casing and provided for connection of the coil.

As described above, the present disclosure provides a stator for a drive motor, the stator including a cooling structure capable of increasing cooling efficiency of a drive motor for a vehicle.

The present disclosure also provides a stator for a drive motor, the stator being equipped with a structure capable of cooling a connection portion of a coil that has been provided in an existing drive motor with no means for cooling the connection portion of the coil.

In addition, the present disclosure provides a stator for a drive motor, the stator being configured to realize an indirect cooling effect to the connection portion of the coil while directly cooling the coil that is a core heating portion in the drive motor with a direct oil cooling method.

The effects of the present disclosure are not limited to those described above, and other effects not mentioned will be clearly recognized by those skilled in the art from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. Specific structures or functions described in the present disclosure are merely for illustrative purposes. Various forms according to the concept of the present disclosure may be implemented, and it should be understood that they should not be construed as being limited to the forms described in the present specification, but include all of modifications, equivalents, or substitutes included in the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular forms only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, the present disclosure will be described in detail with reference to the accompanying drawings.

Figure 3:
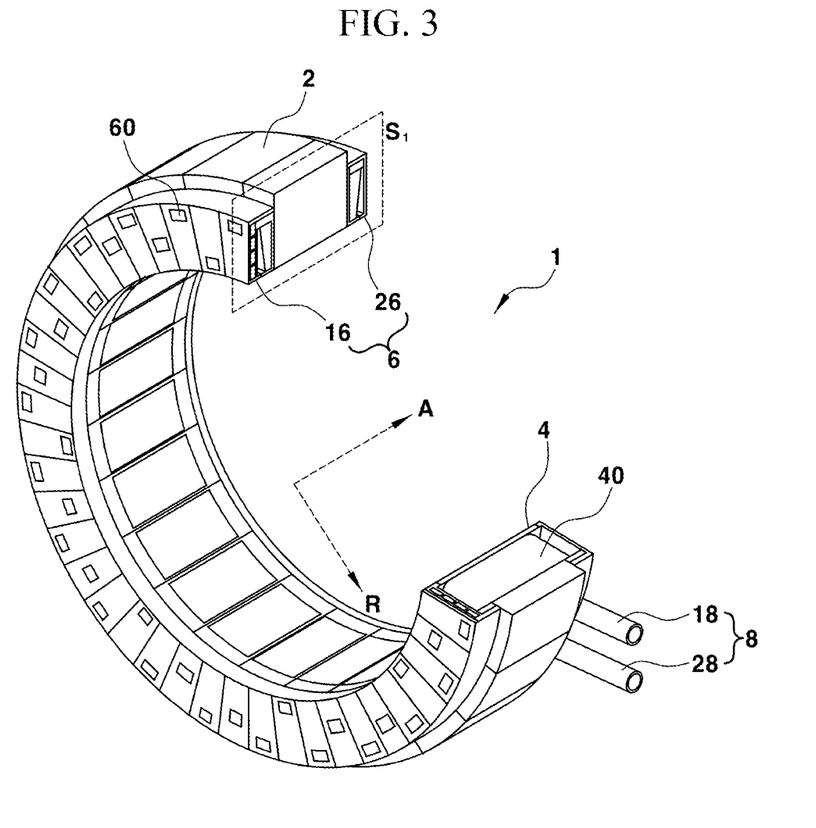
FIG. 3 shows a stator for a drive motor according to the present disclosure.
Figure 4:
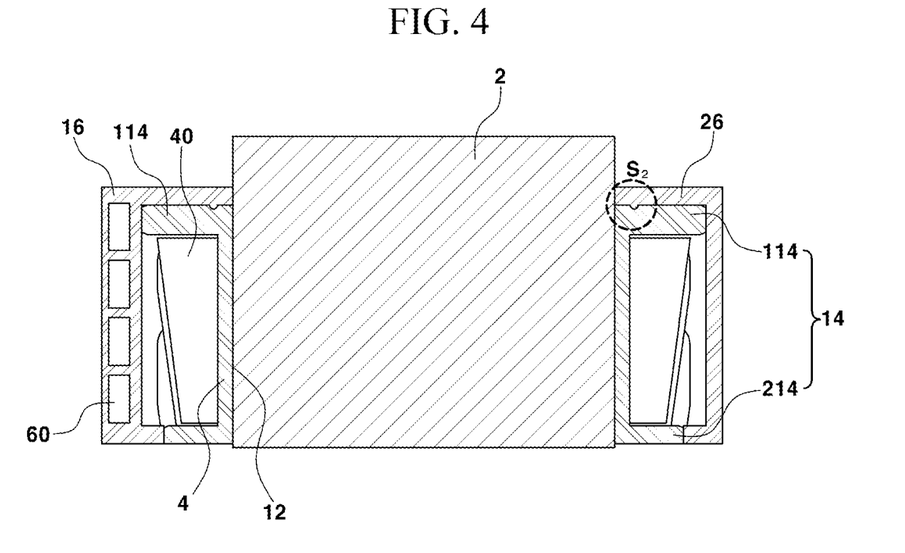
FIG. 4 shows a sectional view of a portion indicated by S1 in FIG. 3.
Figure 5:
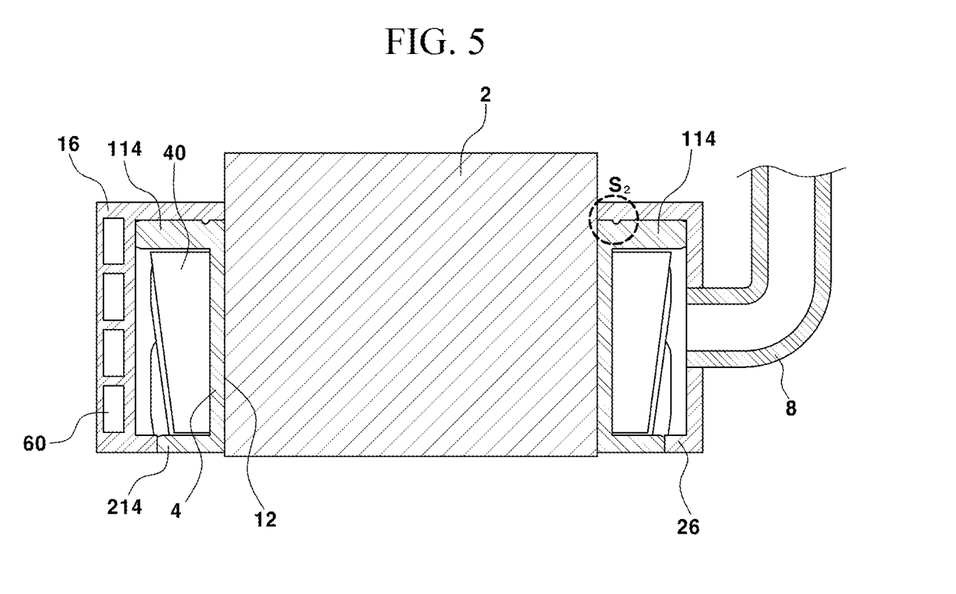
FIG. 5 shows a sectional view of a portion where a passage for the stator according to one form the present disclosure is formed.

As shown in FIGS. 3 to 5, a stator 1 for a drive motor according to one form of the present disclosure includes a segmented stator core 2, a bobbin 4, a casing 6 and a passage 8. The stator 1 according to the present disclosure may be applied to any type of motors, such as a concentrated winding motor, a distributed winding motor, a hairpin winding motor, and the like, without limitation to a winding method.

The segmented stator core 2 is a stator core having a segmented core and includes mounting portions 12 along a circumferential direction. That is, each segmented core includes the mounting portions 12.

The bobbin 4 is mounted on each mounting portion 12 of the segmented stator core 2, and a coil 40 is wound on each bobbin 4. In order to insulate the coil 40 wound on the bobbin 4 from the segmented stator core 2, the bobbin 4 may function as an insulating material.

The bobbin 4 includes protrusions 14 protruding to opposite sides of the segmented stator core 2 with respect to the segmented stator core. According to an exemplary implementation of the present disclosure, the protrusion 14 extends in a direction substantially parallel to the axial direction A of the segmented stator core 2 and protrudes in a direction of distancing away from the segmented stator core 2.

According to an exemplary form of the present disclosure, the protrusion 14 includes an upper protrusion 114 and a lower protrusion 214. The upper protrusion 114 is located close to the outer circumference of the segmented stator core 2. The lower protrusion 214 is located radially inward, close to a center portion of the segmented stator core 2 in a radial direction R. In other words, the lower protrusion 214 is formed closer to a rotor (not shown) positioned inside the segmented stator core 2. According to an exemplary embodiment of the present disclosure, the lower protrusion 214 is formed to have a shorter protruding length than the upper protrusion 114.

According to one exemplary form of the present disclosure, a guide groove 1114 is formed on a top surface of the upper protrusion 114 by being recessed from the surface. The guide groove 1114 may be continuously formed on the surface of the upper protrusion 114 or may be intermittently formed. That is, the guide groove 1114 may be continuously formed on the surface along the circumferential direction of the segmented stator core 2 or may be formed on a part of the surface along the circumferential direction of the segmented stator core 2.

The casing 6 is coupled to the bobbin 4 to enclose the coil 40. The casing 6 may include a first casing 16 and a second casing 26 in order to cover at the opposite sides of the coils 40 protruding to the opposite sides with respect to the segmented stator core 2. Even if the first casing 16 and the second casing 26 are separately formed, the first casing 16 and the second casing 26 may be in fluid communication with each other, as will be described later herein.

For clear explanation and understanding, in FIG. 3, the casing coupled at the inner side (that is, the direction coming out of the page) of the axial direction A of the segmented stator core 2 is referred to as the first casing 16, and the casing coupled at the outer side (that is, the direction going into the page) of the axial direction A, which is the opposite side of the inner side of the axial direction A, is referred to as the second casing 26.

According to an exemplary form of the present disclosure, a guide protrusion 36 protruding from the surface is formed on the inner surface of the casing 6. Since the guide protrusion 36 is configured to mesh with the guide groove 1114 formed on the bobbin 4, the shape of the guide protrusion 36 is formed to correspond to the shape of the guide groove 1114. As described above, when the guide groove 1114 is continuously formed, the guide protrusion 36 is also continuously formed on the inner surface of the casing 6, and when the guide groove 1114 is intermittently formed, the guide protrusion 36 is also formed intermittently or partially on the inner surface of the casing 6.

The casing 6 is provided with the passage 8 for fluid communication between the inside and the outside of the casing 6. Cooling oil flows into and out of the casing 6 through the passage 8. Here, the passage 8 includes an inlet 18 and an outlet 28. The cooling oil is introduced into the casing 6 through the inlet 18, and the cooling oil is discharged out of the casing 6 through the outlet 28.

In addition, a terminal portion 60 is integrally formed in the casing 6. The terminal portion 60 is integrally formed in the casing 6 so that the coil 40 drawn out from the segmented core is arranged in Y-connection or Δ (delta)-connection.

According to an exemplary form of the present disclosure, the terminal portion 60 is arranged in the first casing 16, and the passage 8 is arranged in the second casing 26. On the contrary, the passage 8 is disposed in the first casing 16, and the terminal portion 60 for connection of the coil 40 is disposed in the second casing 26. That is, when the terminal portion 60 is arranged on either one of the first casing 16 and the second casing 26, the passage 8 is arranged on the casing on the other one of the first casing 16 and the second casing 26.

Figure 6:
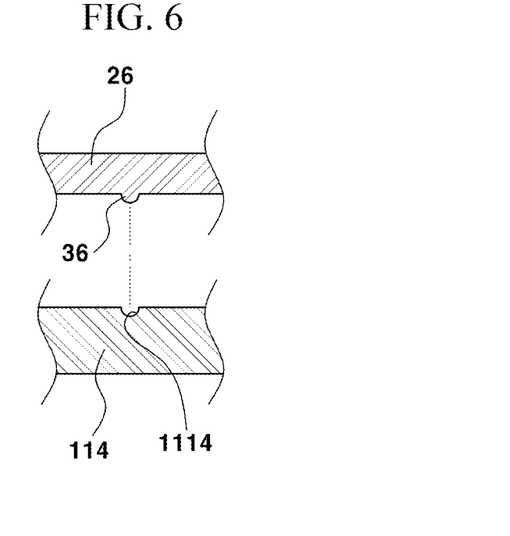
FIG. 6 shows exploded sectional views of a portion indicated by S2 in FIGS. 4 and 5.

The operation of a cooling structure of the stator for the drive motor according to the present disclosure will be described with reference to FIG. 6.

The stator 1 according to the present disclosure includes the casing 6 capable of enclosing the coil 40 protruding outward from the segmented stator core 2 that has a segmented core and is surrounded by the insulating material, such as the bobbin 4, for insulating the coil 40 from the segmented stator core 2. The casing 6 is configured to allow the cooling oil to flow therein, whereby the cooling oil may directly cool the coil 40 and the terminal portion 60.

According to one exemplary form of the present disclosure, the casing 6 is coupled to the bobbin 4 by applying an adhesive, such as an epoxy-based and the like. Alternatively, according to another exemplary form of the present disclosure, as described above, the coupling is guided through the coupling of the guide protrusion 36 and the guide groove 1114, whereby the casing 6 and the bobbin 4 may be coupled to each other. Alternatively, the casing 6 may be coupled by using those mentioned above in combination.

Figure 7:
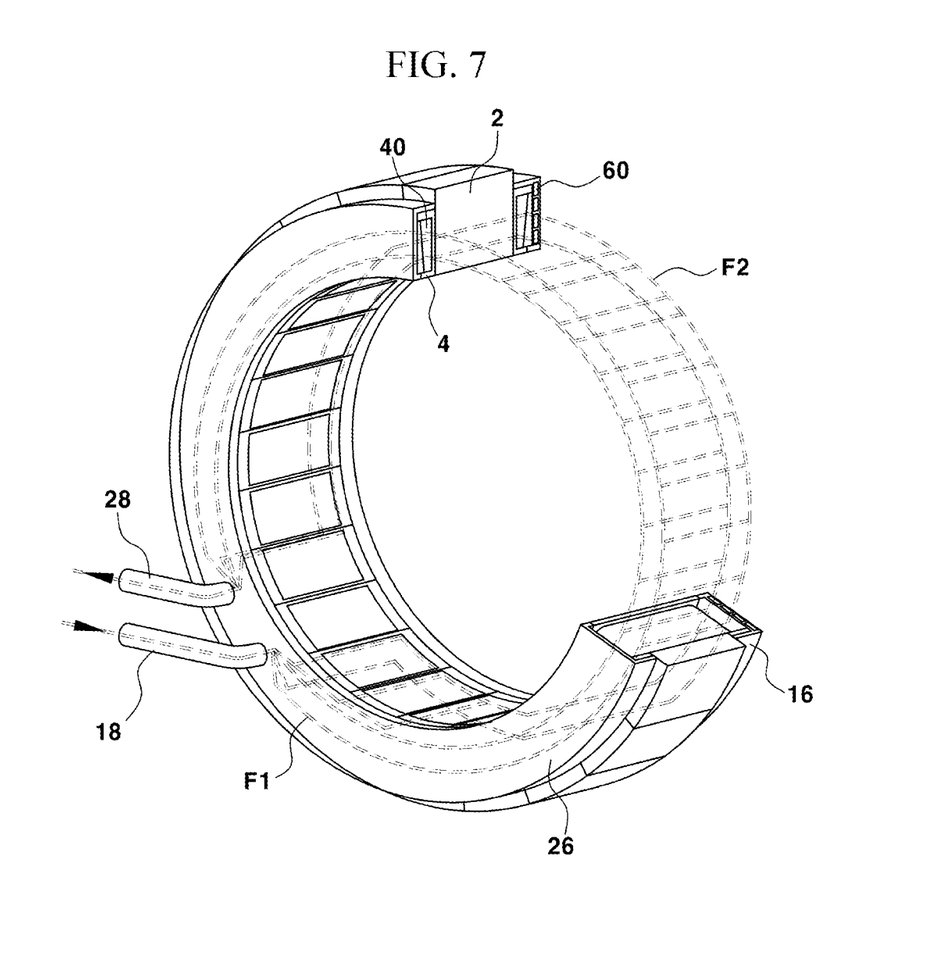
FIG. 7 is a view illustrating a cooling operation of the stator for the drive motor according to one form of the present disclosure.

When the cooling oil flows into the casing 6 through the inlet 18, the cooling oil flows inside the first casing 16 and the second casing along the first flow line F1 and the second flow line F2, respectively. The cooling oil introduced into the second casing 26 through the inlet 18 may flow into the first casing 16 through a gap between the coil 40 and the bobbin 4 (more specifically, between the wound coil 40, a gap between the upper protrusion 114 and the coil 40 or a gap between the lower protrusion 214 and the coil 40) in the second casing 26. That is, the first casing 16 and the second casing 26 are configured to be in fluid communication with each other. The excess cooling oil in the casing 6 may be discharged through the outlet 28. That is, according to the present disclosure, the coil 40 may be cooled through the direct cooling.

In addition, the cooling oil configured to flow in the opposite side casings 16 and 26 can indirectly cool the terminal portion 60 formed integrally with the first casing 16.

The drive motor used in a hybrid vehicle is a core of the vehicle driving and has to produce optimal output and torque in various conditions, such as vehicle speed, desired torque, output, voltage, and the like. To this end, the vehicle is operated by force of the magnetic field created by the current being flown by applying a high voltage to the drive motor. At this time, a great amount of heat is generated. Since the drive motor is in a closed structure, the drive motor may cause power decrease and even be burnt out if it is not properly cooled.

According to the stator of the present disclosure, the coil 40 can be directly cooled and the connection portions of the coil 40 can be indirectly cooled, thereby maximizing cooling effect of the drive motor.

Accordingly, according to the present disclosure, it is possible to improve the power performance of the vehicle, such as an increase in the driving distance of an electric vehicle (EV) mode, an increase in a high torque duration, and the like.

In addition, according to the present disclosure, the overall size may be reduced, and heat resistance of subcomponents may be alleviated, thereby reducing the material costs.

It should be understood that the present disclosure is not limited to the above described embodiments and the accompanying drawings, and various substitutions, modifications, and alterations can be devised by those skilled in the art without departing from the technical spirit of the present disclosure.

What is claimed is:

1. A stator for a drive motor, the stator comprising:
a segmented stator core comprising a plurality of mounting portions;
a bobbin equipped on each mounting portion of the plurality of the mounting portions and having a coil wound thereon;
a casing coupled to the bobbin and configured to enclose the coil, wherein the casing includes a guide protrusion extending in a circumferential direction of the casing and protruding from an inner surface of the casing; and
a passage formed in the casing and configured to allow fluid communication with an inside of the casing, wherein cooling oil flows in and out of the casing, wherein the bobbin comprises a protrusion protruding outward at opposite sides of the segmented stator core and coupled to the casing, wherein the protrusion comprises:

an upper protrusion protruding at a position close to an outermost side in a radial direction of the segmented stator core; and a lower protrusion arranged radially inward from the upper protrusion, and wherein a guide groove is recessed from a top surface of the upper protrusion and configured to mesh with the guide protrusion, and the upper protrusion is positioned inside the casing while mating with the inner surface of the casing.

2. The stator of claim 1, wherein the passage comprises:

an inlet through which the cooling oil is introduced into the casing; and an outlet through which the cooling oil is discharged out of the casing.

3. The stator of claim 1, wherein the lower protrusion is shorter in length than the upper protrusion.

4. The stator of claim 3, wherein a first side of the casing is coupled to the bobbin while being in close contact with the top surface of the upper protrusion, and a second side that is opposite to the first side of the casing is coupled to the bobbin while being in contact with a side surface of the lower protrusion.

5. The stator of claim 4, wherein epoxy is applied between the upper protrusion and the casing, and between the lower protrusion and the casing.

6. The stator of claim 1, wherein the casing comprises a first casing and a second casing coupled to the bobbin at opposite sides, respectively, of the bobbin.

7. The stator of claim 6, wherein the first casing and the second casing are configured to fluidly communicate with each other.

8. The stator of claim 6, wherein the passage is arranged in the first casing, and a terminal portion is formed in the second casing and is configured to allow connection of the coil.

9. A stator for a drive motor, the stator comprising:

a segmented stator core comprising a plurality of mounting portions;

a bobbin equipped on each mounting portion of the plurality of the mounting portions and having a coil wound thereon;

a casing including: a first casing and a second casing coupled to the bobbin at opposite sides, respectively, of the bobbin with respect to the segmented stator core, and configured to enclose the coil, wherein the casing includes a guide protrusion extending in a circumferential direction of the casing and protruding from an inner surface of the casing;

a passage formed in the first casing and configured to fluidly communicate with an inside of the first casing and the second casing, wherein cooling oil flows in and out of the first casing through the passage; and a terminal portion integrally formed in the second casing and configured to allow connection of the coil, wherein the bobbin comprises a protrusion protruding outward at opposite sides of the segmented stator core and coupled to the casing, wherein the protrusion comprises:

an upper protrusion protruding at a position close to an outermost side in a radial direction of the segmented stator core; and a lower protrusion arranged radially inward from the upper protrusion, and wherein a guide groove is recessed from a top surface of the upper protrusion and configured to mesh with the guide protrusion, and the upper protrusion is positioned inside the casing while mating with the inner surface of the casing.

\* \* \* \* \*